United States Patent [19]
Buyze

[11] 3,730,304
[45] May 1, 1973

[54] FABRICATED RING FOR A BRAKE DISK
[75] Inventor: Edwin K. Buyze, Philadelphia, Pa.
[73] Assignee: The Budd Company, Philadelphia, Pa.
[22] Filed: May 26, 1971
[21] Appl. No.: 146,937

[52] U.S. Cl......188/218 XL, 188/71.6, 188/264 AA, 192/107 R, 192/113 A
[51] Int. Cl............................................F16d 65/12
[58] Field of Search............188/73.2, 71.6, 218 XL, 188/264 A, 264 AA; 192/107 R, 113 A

[56] References Cited
UNITED STATES PATENTS
2,197,232  4/1940  Wood...........................192/107 R X
2,410,195  10/1946  Baselt et al.....................188/218 XL
2,411,067  11/1946  Tack..............................188/218 XL
3,486,218  12/1969  Buyze.............................188/218 XL
3,623,579  11/1971  Hendrickson....................188/73.2 X Primary Examiner—George E. A. Halvosa
Attorney—Thomas I. Davenport, Edward M. Farrell, John D. Sowell, Alford L. Trueax, Jr. and William R. Nolte

[57] ABSTRACT

A lighter, less expensive and more easily assembled brake ring for a vehicle disk brake system having a pair of brake plates held in spaced relationship by a plurality of rib structures.

3 Claims, 9 Drawing Figures

INVENTOR.
EDWIN K. BUYZE

Patented May 1, 1973

INVENTOR.
EDWIN K. BUYZE
BY
*C. L. Truex, Jr.*
ATTORNEY

FABRICATED RING FOR A BRAKE DISK

This invention relates to vehicle brake disks and more particularly to a fabricated brake ring for the brake disk.

This invention is related to the method described in my U.S. Pat. No. 3,486,218, "Method of Fabricating a Brake Disk" and my co-pending patent applications "Fabricated Brake Disk Driver," Ser. No. 146,936, filed May 26, 1971.

Previously, brake disks for disk brake assemblies were fabricated or cast for a particular wheel assembly. The most common vehicle wheel sizes were "13", "14" and "15", but each wheel size required a large number of driver sizes and attaching means for the different hub and/or wheels with which the disk was to be used. The above referenced co-pending patent application "Fabricated Brake Disk Driver" shows a means for solving the various attaching means problem.

It is an object of this invention to provide a lighter, less expensive and more easily assembled brake ring for a disk brake assembly.

A further object of this invention is to provide a novel brake ring that easily lends itself to automation during assembly.

These and other objects of this invention will become apparent as reference is made to the following specification and drawings wherein.

Figures 1, 2, 3, 4, 5:
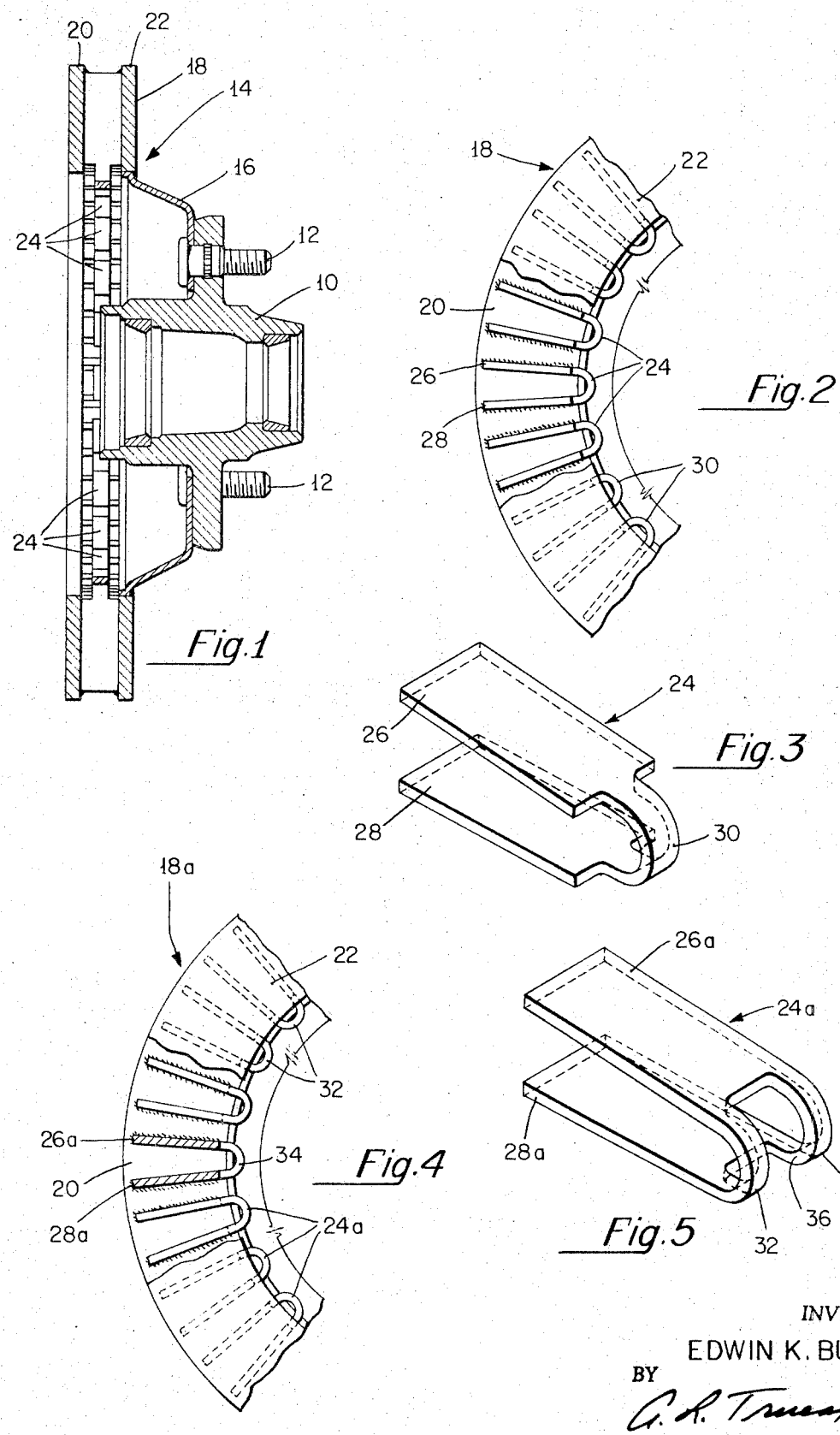
FIG. 1 is a sectional side view of a fabricated brake disk mounted on a vehicle hub.
FIG. 2 is a plan view of a portion of a fabricated brake ring, with portions broken away to illustrate one rib structure for use in a fabricated disk.
FIG. 3 is an isometric view of one of the rib spacer structures used in the disk of FIG. 2.
FIG. 4 is a plan view of a portion of a fabricated brake ring, with portions broken away to illustrate one rib structure for use in a fabricated disk.
FIG. 5 is an isometric view of one of the rib spacer structures used in the disk of FIG. 4.

Referring now to the drawings, as seen in FIG. 1, a vehicle hub 10 having studs 12 secured therein for attaching a vehicle wheel (not shown) and a fabricated brake disk 14.

The fabricated brake disk 14 includes a driver 16 secured to the hub 10 by the studs 12 and a brake ring 18 joined to one edge of the driver by welding or other suitable means.

One embodiment of the novel ring construction of this invention is illustrated in FIGS. 1-3. The ring 18 includes a pair of substantially parallel brake plates 20, 22 held in spaced relation to each other by a plurality of ribs 24. As best seen in FIG. 3, the rib 24 includes a pair of spacer members 26, 28 joined by a reduced center section 30.

The brake ring 18 is formed by placing the ribs 24 between the brake plates 20, 22 with the spacer members 26, 28 substantially at right angles to the planes of the plates 20, 22 and then securing the plates to the ribs as by welding thereby forming the brake plate.

The center section 30 lends itself to automation equipment for holding and locating the rib 24 during assembly of the brake ring prior to welding. The opening provided on each side of the center section 30 permits circulation of air between the plates 20, 22 and the rib spacer members 26, 28.

The second embodiment of rib construction is shown in the brake ring 18a of FIGS. 4 and 5. The rib 24a includes a pair of spacer members 26a, 28a joined by a pair of center straps 32, 34 forming a central aperture 36 therebetween for ventilating air to pass between the plates 20, 22 and rib spacers 26a, 28a.

Figure 8:
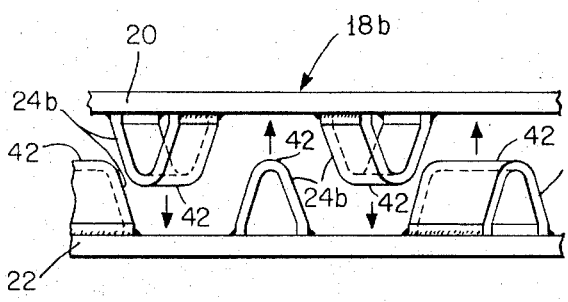
FIG. 8 is an edge view of another rib structure and brake plates prior to joining to form a brake ring.
Figure 9:
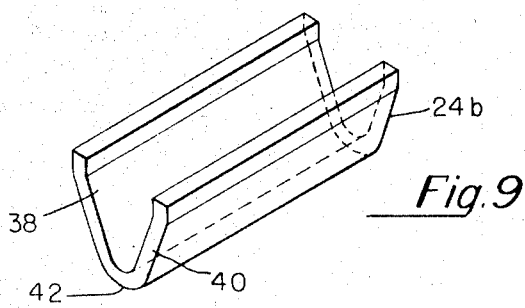
FIG. 9 is an isometric view of the rib spacer structure used in the disk of FIG. 8.

A third embodiment of the rib construction is shown in FIGS. 8 and 9. The rib structure 24b is formed substantially as a "V" with the legs 38, 40 of the "V" and the apex 42 contacting and being joined to the plates 20, 22. In the assemblying of this embodiment, the legs 38 and 40 are joined to one of the plates 20 or 22 in every other position so that the two plates and their rib structures may then have the nadir of the "V" joined to the other plate to form a brake ring 18b having the "V" shapes alternating in the upright and upsidedown positions.

All of these simplified rib designs lend themselves to simple blanking and bending operations from sheet of strip material with very little wasted material.

Figure 6:
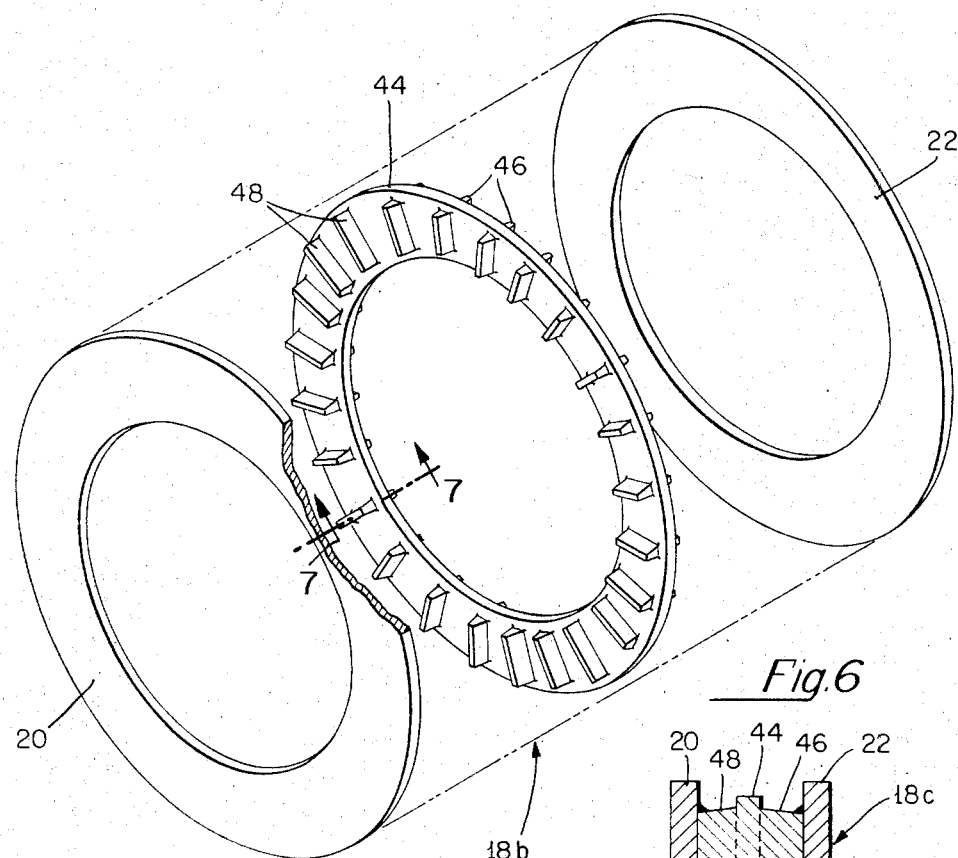
FIG. 6 is an exploded isometric view of a fabricated brake ring utilizing a forged or cast center spacer.
Figure 7:
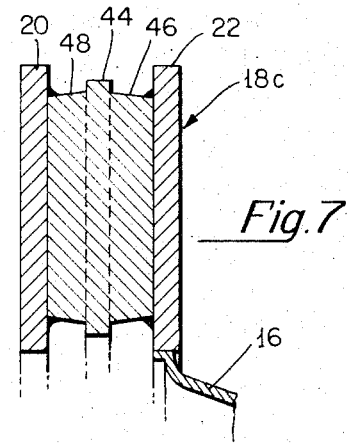
FIG. 7 is a sectional view of a portion of the assembled brake ring shown in FIG. 6.

A fourth embodiment of this invention shown in FIGS. 6 and 7 includes a center spacer structure or plate 44 having fingers 46, 48 extend therefrom towards the plates 20, 22 for being joined to the plates to form the brake ring 18c. The space structure 44 of this embodiment is easily fabricated by forging or casting.

All of the components of the brake ring shown and described would lend themselves to automation practices for ease of assembly. Once assembled in a holding fixture, electron beam welding of the contacting surfaces could easily join the units.

While several embodiments of this invention have been illustrated and described, various modifications are apparent without departing from the scope of the following claims.

I claim:

1. In a disk brake assembly for a vehicle having a hub for supporting a vehicle wheel, a fabricated brake disk supported on said hub, said brake disk assembled from subassemblies including a fabricated brake ring and a sheet metal driver joined to said brake ring and supported on said hub, said fabricated brake ring including a pair of substantially parallel braking plates, rib structure means extending between said plates and secured thereto for maintaining said plates in spaced relationship, said rib structure means comprises a plurality of separate and curcumferentially spaced ribs extending radially between said plates, each of said ribs having a pair of spacer members extending radially from the center of said brake ring and substantially normal to said brake plates, and a reduced center section connecting the inner edges of said spacer members thereby forming a pair of apertures between the brake plates, spacer members and center section for air to ventilate between the plates, and one of said plates having an attaching surface for being joined to a compatible attaching surface of said driver.

2. In a brake disk assembly for a vehicle having a hub for supporting a vehicle wheel, a fabricated brake disk supported on said hub, said brake disk assembled from sub-assemblies including a fabricated brake ring and a sheet metal driver joined to said brake ring and supported on said hub, said fabricated brake ring including a pair of substantially parallel braking plates, rib structure means extending between said plates and secured thereto for maintaining said plates in spaced relationship, said rib structure means comprises a plurality of separate and circumferentially spaced ribs extending radially between said plates, each of said ribs having a pair of spacer members extending radially from the center of said brake ring and substantially normal to said brake plates, and a pair of straps extending between the inner edges of said spacer members, said straps and spacer members forming a central aperture for ventilating air to pass between said spacer members and said plates, and one of said plates having an attaching surface for being joined to a compatible attaching surface of said driver.

3. In a brake disk assembly for a vehicle having a hub for supporting a vehicle wheel, a fabricated brake disk supported on said hub, said brake disk assembled from sub-assemblies including a fabricated brake ring and a sheet metal driver joined to said brake ring and supported on said hub, said fabricated brake ring including a pair of substantially parallel braking plates, rib structure means extending between said plates and secured thereto for maintaining said plates in spaced relationship, said rib structure means comprises a plurality of separate and independent ribs spaced circumferentially and extending radially between said plates, each rib having a generally "V" spaced cross-sectional shape, the ends of each leg of the rib being joined to one of said plates and the nadir of the "V" being joined to the other of said plates, said ribs alternating points of contact on each plate having the legs of one rib, secured to the plate and the nadir of the adjacent ribs secured to the same plate, said ribs maintaining a constant angular relationship the entire radial distance of contact between the ribs and the plate, and said ribs cooperating with said plates for providing cooling air passages between said plates having unobstructed substantially rectangular cross-sectional openings alternating with unobstructed substantially triangular cross-sectional openings, and one of said plates having an attaching surface for being joined to a compatible attaching surface of said driver.

* * * * *